Figure 1:
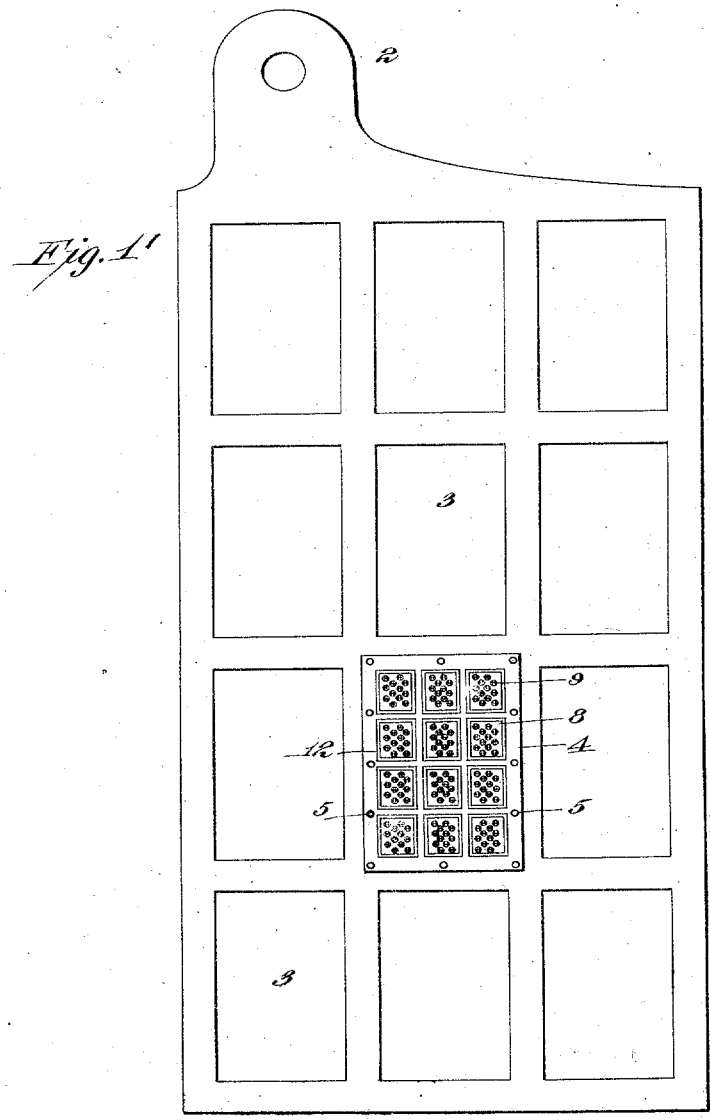

No. 831,269. PATENTED SEPT. 18, 1906.
T. A. EDISON.
STORAGE BATTERY ELECTRODE PLATE.
APPLICATION FILED MAR. 5, 1903.

3 SHEETS—SHEET 2.

No. 831,269. PATENTED SEPT. 18, 1906.
T. A. EDISON.
STORAGE BATTERY ELECTRODE PLATE.
APPLICATION FILED MAR. 5, 1903.

3 SHEETS—SHEET 3.

Witnesses:
Jas. F. Coleman
Jno. Robt Taylor

Inventor
Thomas A Edison
by Dyer Edmonds & Dyer
Attorneys

UNITED STATES PATENT OFFICE.

THOMAS A. EDISON, OF LLEWELLYN PARK, NEW JERSEY, ASSIGNOR TO EDISON STORAGE BATTERY COMPANY, OF WEST ORANGE, NEW JERSEY, A CORPORATION OF NEW JERSEY.

STORAGE-BATTERY ELECTRODE-PLATE.

No. 831,269.            Specification of Letters Patent.            Patented Sept. 18, 1906.

Application filed March 5, 1903. Serial No. 146,342.

*To all whom it may concern:*

Be it known that I, THOMAS A. EDISON, a citizen of the United States, residing at Llewellyn Park, Orange, in the county of Essex and State of New Jersey, have invented a certain new and useful Improvement in Storage-Battery Electrode-Plates, of which the following is a description.

My invention relates to an electrode-plate or electrode which has been designed especially for use in connection with storage batteries employing an alkaline electrolyte with insoluble active materials, as I have described in patents already granted; and my object is to provide a simple, cheap, and effective electrode-plate for use in connection with large cells employed under conditions in which weight is not objectionable—such, for example, as in electric lighting and railway installations.

Another object of my invention is to subdivide the active material and hold the same under pressure in pockets of material which is inactive and insoluble as regards the electrolyte and having large perforations which are closed by inactive and insoluble elastic thin plates having numerous minute perforations and being capable of yielding under pressure caused by the swelling of the active material and of returning to their original shape when the pressure ceases.

In carrying my invention into effect I construct a battery-electrode plate of inactive and insoluble material with a plurality of integral pockets or receptacles for containing the active material and maintain the latter under pressure within the pockets or receptacles by means of closing-plates secured, preferably, in place by overturning the metal around the edges of the pockets or receptacles over upon the closing-plates, all as I will more fully hereinafter describe and claim. The pockets or receptacles, as well as the closing-plates, are perforated, so as to permit the electrolyte to reach the active materials. The plates in question are made of relatively thick metal—say .02 of an inch—so as to effectively resist any tendency of the active material to swell due to absorption of the electrolyte or to charging or discharging. For the purpose of economy in manufacture the perforations formed in the integral receptacles as well as in the closing-plates are quite large, and the active material is prevented from exuding through these perforations by interposing a very thin sheet of an inactive and insoluble elastic material, such as nickel-plated steel, on each side of the active material and which are formed with extremely small perforations through which the active material cannot pass. These finely-perforated protecting-sheets may be made extremely thin—say .0025 of an inch—since their exposed surfaces will be limited to the area of the larger perforations in the receptacles and in the closing-plates therefor. These thin sheets are capable of yielding under pressure due to the swelling of the active material; but on account of the small areas to which the strains are confined the distortion will be slight and the sheets will return to their original shapes when the pressure ceases. Preferably a series of plates arranged as described are removably secured within openings formed in a large grid of considerable thickness—say one-sixteenth of an inch—so that by assembling a series of grids as so constructed, immersed in an alkaline solution with the proper active materials, a complete storage-battery of large size will be formed.

In order that the invention may be better understood, attention is directed to the accompanying drawings, forming part of this specification, and in which—

Figure 2:
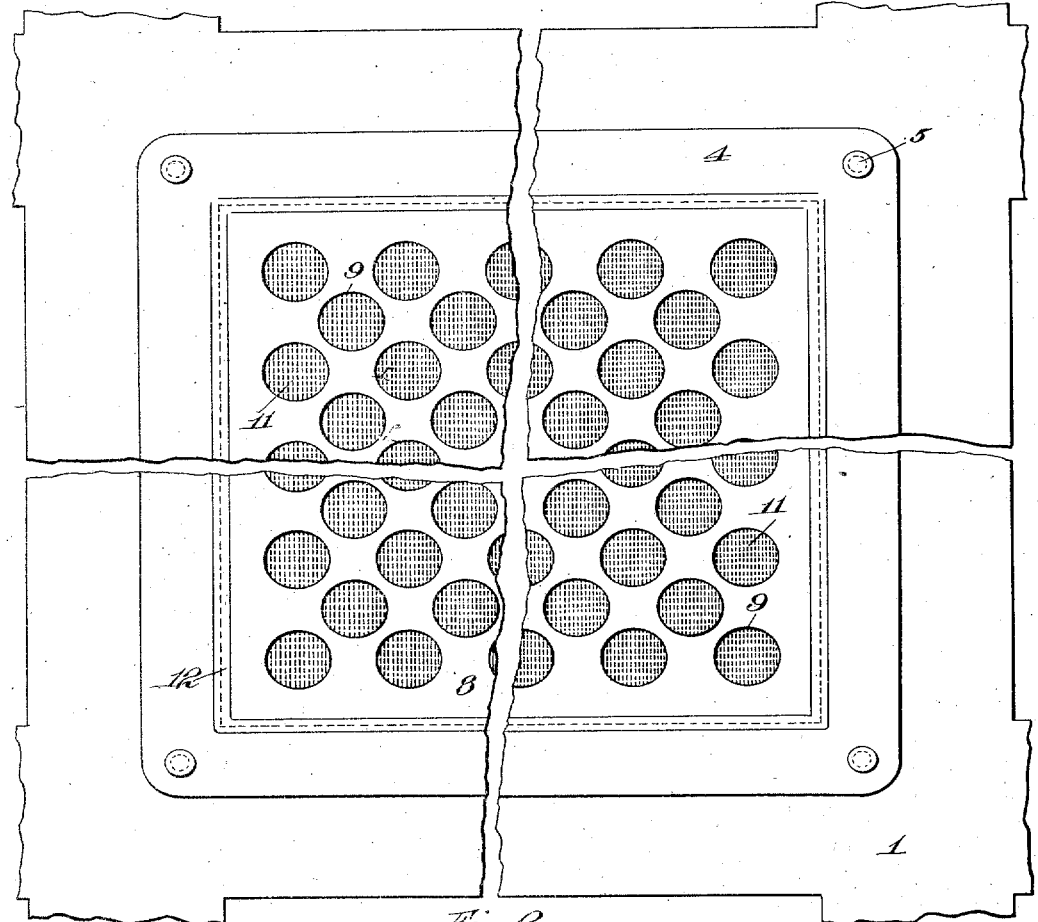
Figure 3:
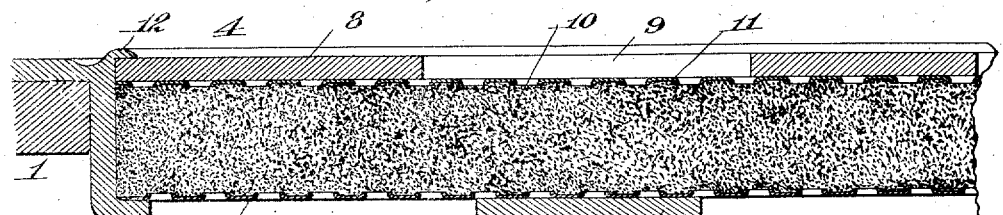
Figure 4:
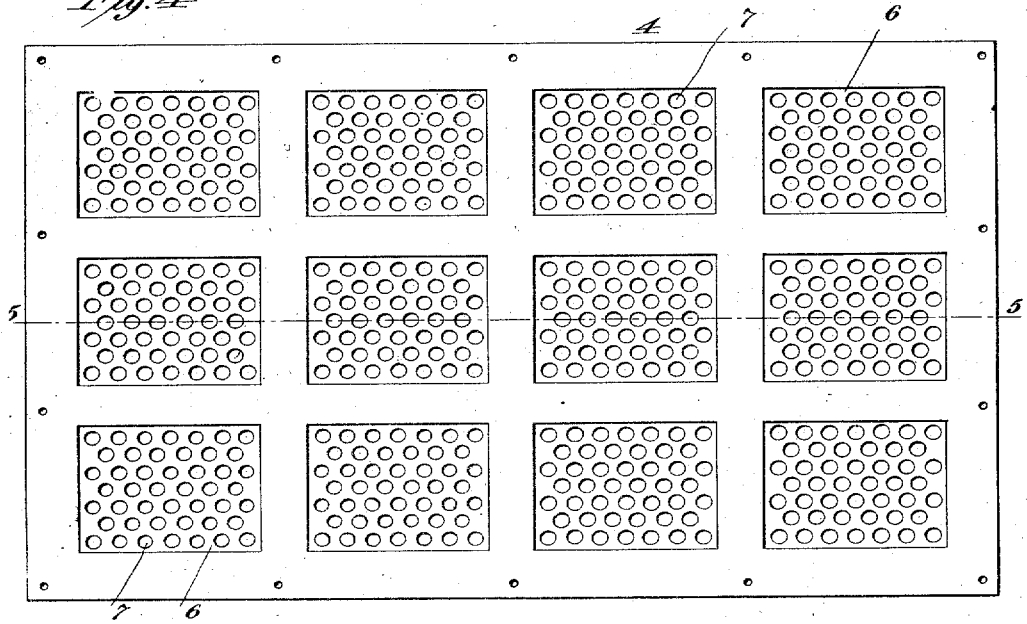
Figure 5:
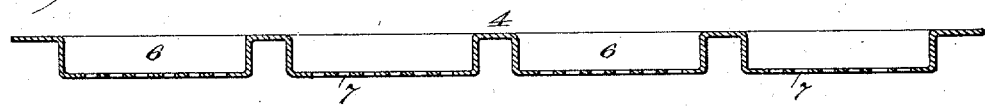
Figure 6:
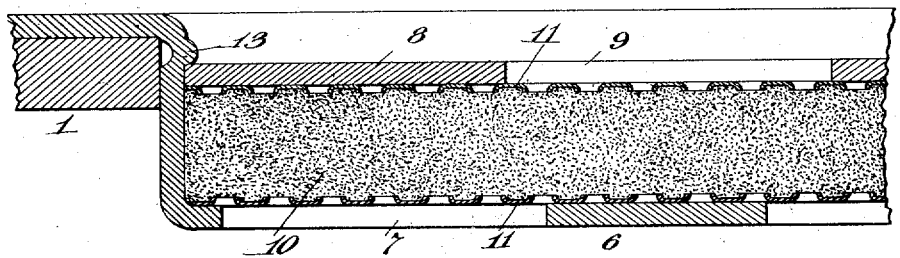

Figure 1 represents a complete grid, showing one of the electrode-plates in position therein; Fig. 2, an enlarged plan view of a portion of one of the electrode-plates, showing a closing-plate in position in one of the pockets or receptacles; Fig. 3, a greatly-enlarged sectional view; Fig. 4, a plan view of one of the electrode-plates removed from the supporting-grid; Fig. 5, a section on the line 5 5 of Fig. 4, and Fig. 6 a section showing a modified arrangement for holding the closing-plates of the pockets in place.

In all of the above views corresponding parts are represented by the same numerals of reference.

The grid 1 is of large size and is formed of sheet iron or steel of considerable thickness—say one-sixteenth of an inch. This grid is formed with a lug or ear 2, by which the proper electrical connection therewith can be made. Formed in the grid are a series of openings 3, which in practice may be about six inches wide and ten inches long. The grid 1 is carefully nickel-plated, so as to be unaffected by electrolytic action in the alkaline solution. After the electroplating of the grid the electroplated coating is preferably welded in place in a hydrogen atmosphere maintained until the grid becomes finally cooled, as I describe in Letters Patent No. 734,522, dated July 28, 1903. By this process of nickel-plating the coating becomes intimately associated with the base, and any condition of tension is overcome which in ordinary processes makes the electroplated coating liable to scale off.

Secured in position over each of the openings 3 is an electrode-plate 4, held in place by rivets 5 or in any other suitable way. The electrode-plates 4 are also made of iron or steel, carefully nickel-plated, as explained, and in practice they may be made about .02 of an inch in thickness, so as to effectively resist any bulging strains within the active material due to absorption of the electrolyte or to internal gasing or from other causes arising in charging or discharging. Each electrode-plate 4 is provided with a series of integral pockets or receptacles 6, formed by means of drawing-dies or an analogous stamping operation. Each of these pockets or receptacles is formed on its outer face with a series of perforations 7 therein, which are of comparatively large size. The nickel-plating of the electrode-plates is effected after the perforating thereof and preferably after the formation of the integral pockets or receptacles. In order to close each of the receptacles 6, I make use of a nickel-plated closing-plate 8, preferably flat and provided with a series of perforations 9 therein corresponding with the perforations 7.

The active material 10 is of any suitable character; but I preferably employ in the make-up of the oxidizable electrode a mixture of electrolytically-active finely-divided metallic iron or iron oxid, mercury, and copper, as I describe in Letters Patent No. 723,450, dated March 24, 1903, and for the make-up of the oxidizing or depolarizing electrode I make use of a mixture of electrolytically-active hydroxid of nickel and flak graphite. Obviously, however, other suitable insoluble active materials may be used.

In order to prevent the particles of active material from exuding through the perforations 7 or 9 in use, I interpose on each side of the active material sheets 11, made of an inactive and insoluble elastic material, such as nickel-plated steel, and provided with extremely fine closely-adjacent perforations, as shown, similar in all respects to the material used in the make-up of the sectional pockets of my improved storage battery as described in patents already granted. (See, for example, Patent No. 700,137, dated May 13, 1902.) These protecting-plates may be made extremely thin—say .0025 of an inch—since they are exposed to bulging strains within the active material only at points coincident with the perforations 7 and 9, as will be understood.

In assembling the parts composing one of the electrode-plates I first introduce into the several pockets or receptacles 6 thereof one of the thin protecting-sheets 11. I then introduce into each of the pockets or receptacles the mass of active material, either in loose form in the proper quantity or as a compressed briquet of the desired mass. I now place upon the top of each mass of active material a second protecting-sheet 11, and finally place on top of each of these protecting-sheets one of the closing-plates 8. Pressure is now applied to force all of the closing-plates within their respective pockets or receptacles, and a tool is then employed to turn over the metal, as at 12, around the edges of the pockets or receptacles upon the closing-plates to hold the latter firmly in place and maintain the active material under the desired pressure. Instead of securing the closing-plates in place by overturning the metal upon them as described the arrangement shown in Fig. 6 may be employed, wherein the pockets or receptacles are made sufficiently deep to permit a bead 13 to be formed in their walls to engage over the closing-plates. A series of electrode-plates constructed as described are now secured in position within the openings 3 of a suitable grid, and several of these grids are assembled together in an alkaline electrolyte, so as to constitute a storage battery of large size.

Having now described my invention, what I claim is—

1. In a storage battery, in combination with an alkaline electrolyte, an inactive and insoluble electrode-plate having pockets containing active material, one portion of the pocket being of comparatively thick metal and another portion of thin elastic metal supported by the thicker metal, substantially as set forth.

2. In a storage battery, in combination with an alkaline electrolyte, an inactive and insoluble electrode-plate having pockets containing active material under pressure, one portion of the pocket being of comparatively thick metal and another portion of thin elastic metal supported by the thicker metal, substantially as set forth.

3. In a storage battery, in combination with an alkaline electrolyte, an inactive and insoluble electrode-plate formed with an integral perforated pocket or receptacle containing active material, and elastic means for permitting expansion of said active material, substantially as set forth.

4. In a storage battery, in combination with an alkaline electrolyte, an inactive and insoluble electrode-plate formed with an integral perforated pocket or receptacle containing active material under pressure, and elastic means for permitting expansion of said active material, substantially as set forth.

5. An electrode-plate for a storage battery having a perforated elastic pocket or receptacle, a finely-perforated sheet within the pocket or receptacle closing the perforations thereof, and active material maintained within the pocket or receptacle in contact with the finely-perforated sheet, substantially as set forth.

6. An electrode-plate for a storage battery having an integral perforated pocket or receptacle, a perforated closing-plate fitted over the mouth of the pocket or receptacle, active material within the pocket or receptacle, and finely-perforated elastic sheets between the active material and the perforated faces of the pocket or receptacle and the closing-plate respectively, substantially as set forth.

7. The combination with a supporting-grid having an opening therein, of a removable electrode-plate secured within said opening and provided with a series of closed perforated pockets containing the active material, substantially as set forth.

8. In a storage battery, in combination with an alkaline electrolyte, a built-up storage-battery electrode consisting of a rigid, nickel-plated grid having a plurality of openings therein and nickel-plated electrode-plates riveted to said grid to cover said openings, each of said plates being provided with a plurality of perforated pockets or receptacles containing active material, substantially as set forth.

This specification signed and witnessed this 30th day of January, 1903.

THOMAS A. EDISON.

Witnesses:
J. F. RANDOLPH,
FRANK L. DYER.

---

Correction in Letters Patent No. 831,269.

It is hereby certified that in Letters Patent No. 831,269, granted September 18, 1906, upon the application of Thomas A. Edison, of Llewellyn Park, New Jersey, for an improvement in "Storage-Battery Electrode-Plates," an error appears in the printed specification requiring correction, as follows: Page 3, line 10, the word "elastic" following the word "perforated" should be stricken out and inserted before the word "sheet," line 11; and that the said Letters Patent should be read with this correction therein that the same may conform to the record of the case in the Patent Office.

Signed and sealed this 6th day of November, A. D., 1906.

[SEAL.]

E. B. MOORE,
*Acting Commissioner of Patents.*

4. In a storage battery, in combination with an alkaline electrolyte, an inactive and insoluble electrode-plate formed with an integral perforated pocket or receptacle containing active material under pressure, and elastic means for permitting expansion of said active material, substantially as set forth.

5. An electrode-plate for a storage battery having a perforated elastic pocket or receptacle, a finely-perforated sheet within the pocket or receptacle closing the perforations thereof, and active material maintained within the pocket or receptacle in contact with the finely-perforated sheet, substantially as set forth.

6. An electrode-plate for a storage battery having an integral perforated pocket or receptacle, a perforated closing-plate fitted over the mouth of the pocket or receptacle, active material within the pocket or receptacle, and finely-perforated elastic sheets between the active material and the perforated faces of the pocket or receptacle and the closing-plate respectively, substantially as set forth.

7. The combination with a supporting-grid having an opening therein, of a removable electrode-plate secured within said opening and provided with a series of closed perforated pockets containing the active material, substantially as set forth.

8. In a storage battery, in combination with an alkaline electrolyte, a built-up storage-battery electrode consisting of a rigid, nickel-plated grid having a plurality of openings therein and nickel-plated electrode-plates riveted to said grid to cover said openings, each of said plates being provided with a plurality of perforated pockets or receptacles containing active material, substantially as set forth.

This specification signed and witnessed this 30th day of January, 1903.

THOMAS A. EDISON.

Witnesses:
J. F. RANDOLPH,
FRANK L. DYER.

---

Correction in Letters Patent No. 831,269.

It is hereby certified that in Letters Patent No. 831,269, granted September 18, 1906, upon the application of Thomas A. Edison, of Llewellyn Park, New Jersey, for an improvement in "Storage-Battery Electrode-Plates," an error appears in the printed specification requiring correction, as follows: Page 3, line 10, the word "elastic" following the word "perforated" should be stricken out and inserted before the word "sheet," line 11; and that the said Letters Patent should be read with this correction therein that the same may conform to the record of the case in the Patent Office.

Signed and sealed this 6th day of November, A. D., 1906.

[SEAL.]

E. B. MOORE,
*Acting Commissioner of Patents.*

It is hereby certified that in Letters Patent No. 831,269, granted September 18, 1906, upon the application of Thomas A. Edison, of Llewellyn Park, New Jersey, for an improvement in "Storage-Battery Electrode-Plates," an error appears in the printed specification requiring correction, as follows: Page 3, line 10, the word "elastic" following the word "perforated" should be stricken out and inserted before the word "sheet," line 11; and that the said Letters Patent should be read with this correction therein that the same may conform to the record of the case in the Patent Office.

Signed and sealed this 6th day of November, A. D., 1906.

[SEAL.]

E. B. MOORE,
*Acting Commissioner of Patents.*